US008659874B2

(12) United States Patent
Shaffer et al.

(10) Patent No.: US 8,659,874 B2
(45) Date of Patent: Feb. 25, 2014

(54) ENERGY STORAGE DEVICE

(75) Inventors: Milo Shaffer, London (GB); Emile Greenhalgh, London (GB); Alexander Bismarck, London (GB); Paul T. Curtis, Porton Down (GB)

(73) Assignee: Imperial Innovations Limited, London (GB)

( * ) Notice: Subject to any disclaimer, the term of this patent is extended or adjusted under 35 U.S.C. 154(b) by 917 days.

(21) Appl. No.: 12/297,811

(22) PCT Filed: Apr. 20, 2007

(86) PCT No.: PCT/GB2007/001450
§ 371 (c)(1),
(2), (4) Date: Mar. 3, 2009

(87) PCT Pub. No.: WO2007/125282
PCT Pub. Date: Nov. 8, 2007

(65) Prior Publication Data
US 2010/0259866 A1   Oct. 14, 2010

(30) Foreign Application Priority Data
Apr. 21, 2006   (GB) .................................. 0607957.8

(51) Int. Cl.
*H01G 9/00* (2006.01)
(52) U.S. Cl.
USPC .......................................... 361/502; 361/503
(58) Field of Classification Search
USPC ................................................. 361/502, 503
See application file for complete search history.

(56) References Cited

U.S. PATENT DOCUMENTS

| 4,510,216 A * | 4/1985 | Nogami et al. ............... 429/101 |
| 4,730,239 A * | 3/1988 | Currie et al. .................. 361/502 |
| 5,793,603 A | 8/1998 | Lyman |
| 7,351,444 B2 * | 4/2008 | Wang et al. .................... 427/115 |
| 7,855,017 B1 * | 12/2010 | Snyder et al. ................. 429/304 |
| 2002/0008956 A1 * | 1/2002 | Niu ................................ 361/502 |
| 2002/0080557 A1 * | 6/2002 | Suhara et al. ................ 361/502 |
| 2003/0169558 A1 | 9/2003 | Olson et al. |
| 2004/0229117 A1 * | 11/2004 | Mitani et al. .................. 429/160 |

FOREIGN PATENT DOCUMENTS

JP           62226561 A   * 10/1987

OTHER PUBLICATIONS

Printout from Website, http://tiims.tamu.edu/research/multifunct.html, of Texas Institute for Intelligent Bio-Nano Materials and Structures for Aerospace Vehicles, "Multifunctional Materials Systems", Nov. 25, 2005, 2 pages.
Snyder, James F., et al., Proceedings of the 24th Army Science Conference, "Integrating Structure With Power in Battery Materials", pp. 1-2, Nov. 29-Dec. 2, 2004.
Snyder, James F., et al., "Multifunctional Structural Composite Batteries for U.S. Army Applications", pp. 1-9, apparently Proceedings of the 2006 Army Science Conference, Nov. 27-30, 2006.

* cited by examiner

*Primary Examiner* — Eric Thomas
(74) *Attorney, Agent, or Firm* — Fay Sharpe LLP

(57) ABSTRACT

An energy storage device includes a supercapacitor having first and second electrodes, each including a composite of a mat of conducting fibers bound by an electrolytic resin. A method of fabricating a super capacitor includes constructing a mat of conducting fibers, binding the mat with an electrolytic resin, and forming a laminate of the electrodes spaced by an insulating spacer.

18 Claims, 4 Drawing Sheets

ENERGY STORAGE DEVICE

Figure 1:
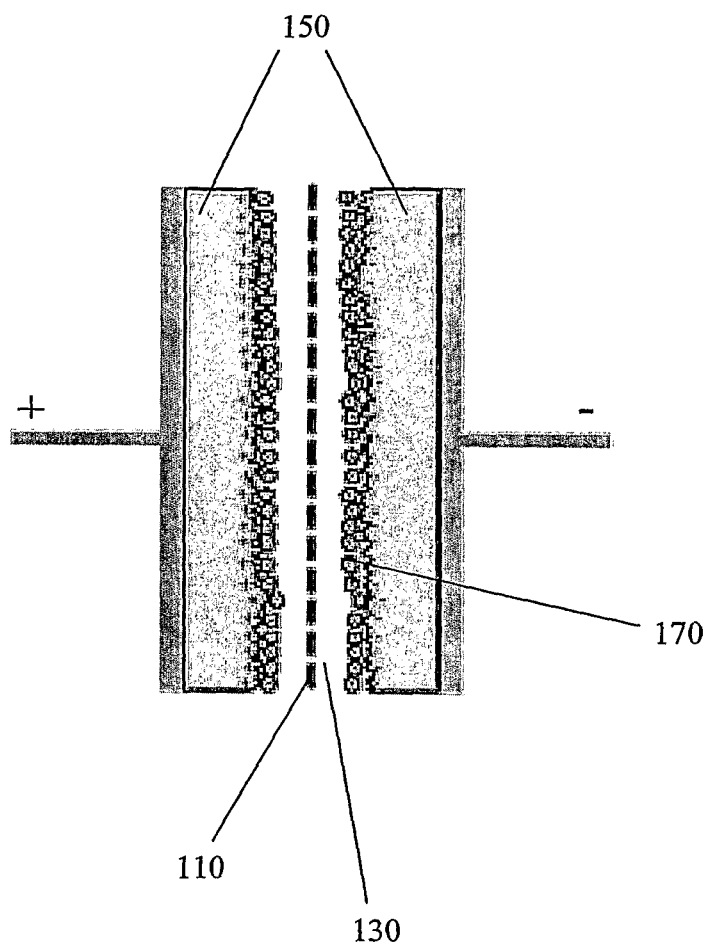

This invention relates to an energy storage device, in particular a structural supercapacitor.

BACKGROUND

In the design of most electric or electronic devices consideration is given to the physical size and weight of the object. For many portable devices, there is a desire to optimise the physical parameters. Usually, this means minimising the physical size or weight. Quite often the limiting factor is related to the energy storage device or devices; for example, the battery (e.g. in a mobile telephone) or the capacitor banks (e.g. for a high power laser).

Further design optimisation is achievable by making components multifunctional. The energy source is often one of the largest or heaviest single components in an electric device and is thus one which would benefit most from being multifunctional. One example of multifunctionality is to add mechanical stiffness or load-carrying capacity to an energy storage device. Conventionally structurally strong components are incorporated into the design at the cost of added weight or bulk. As weight is premium in many devices such a component that does not contribute to the load-carrying capacity—it is structurally parasitic.

Conventionally batteries add significant weight and volume without contributing to structural performance; rather, the structural requirements are increased by the need to support and house the batteries. Accordingly attempts have been made to produce multifunctional batteries which contribute to the mechanical strength of the device they supply.

According to one known approach energy storage devices have been fabricated in thin modules that can easily be accommodated within a larger device; this approach has been developed with Li-polymer batteries, the batteries being shaped such that their casing performs a useful structural role. However, the benefits of this approach are limited and these materials are not truly multifunctional in the sense that the active chemicals of the battery are not themselves contributing structurally. Other attempts include autophagous ("self-consuming") structure-fuel systems and the use of fuel to inflate structural elements. However, these approaches are very limited in application, as the structural properties degrade as the fuel is consumed.

According to other known approaches rechargeable, solid-state thin film composite batteries for integration into structures are used. In this case monofilament reinforcing fibres are coated with conventional solid-state rechargeable batteries in order to provide lightweight structures and ballistic protection with integrated electrical power storage. The materials used for this battery design may be able to bear a portion of the mechanical load, thus providing energy storage that contributes structurally.

In many cases, development of structural batteries has focused on the development of carbon based anodes with both $Li^+$ intercalation ability and reasonable structural properties. A composite battery design based on Lithium ion cells has been developed using a composite stacking approach; a $Li^+$ ion source as anode is separated by a glass fibre fabric layer from a carbon fibre cathode, with a polymer electrolyte matrix. Currently, the prototypes are at an early stage and do not provide net weight benefits. It is not clear how the volume changes associated with intercalation will be accommodated. In addition, a new design of fuel cell based on aluminium foam/carbon fibre sandwich structure, with an internal Nafion electrolyte membrane to separate anode from cathode, is being developed but manifolding and mechanical difficulties are hindering progress. Furthermore, conventional capacitor laminates based on aluminium layers deposited on a variety of insulators (e.g. polycarbonate film, PC/glass, and epoxy/glass) have been fabricated but energy density is currently an order of magnitude below commercial conventional capacitors.

The invention is set out in the claims. The structural energy storage device described herein contributes both energy storage and mechanical strength to a system in which it is incorporated. The mechanical strength is owing to two factors: the design of matted or woven-laminate electrodes based for example on activated carbon fibres and a resin or polymer electrolyte which impregnates the electrodes. The available energy density may be increased by using activated carbon fibres with a high surface area. Power densities greater than that obtained from batteries are realised by capacitance that arises from the electrochemical double-layer at the electrode surfaces.

Figure 2:
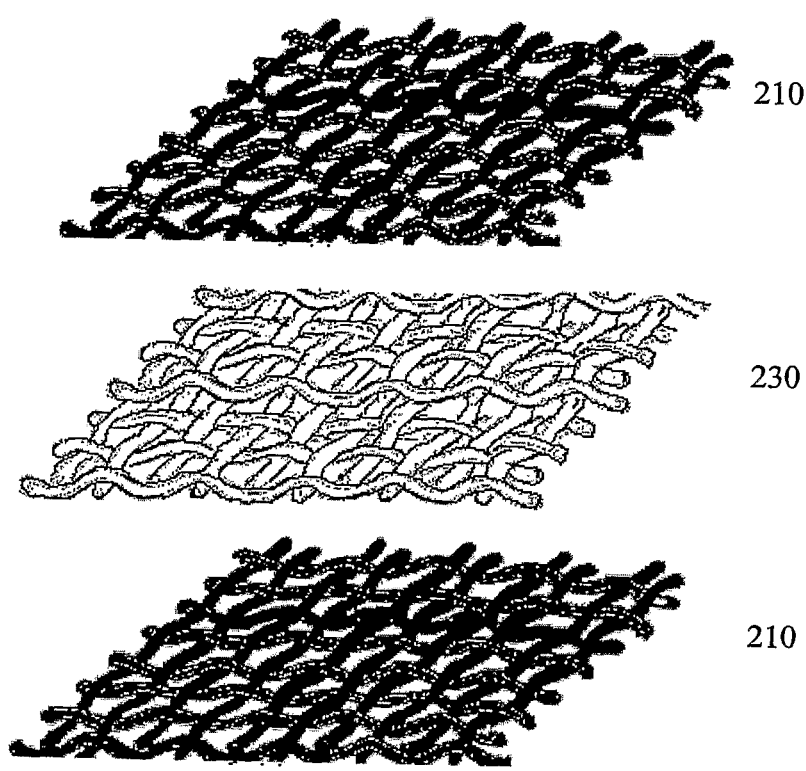
Figure 3:
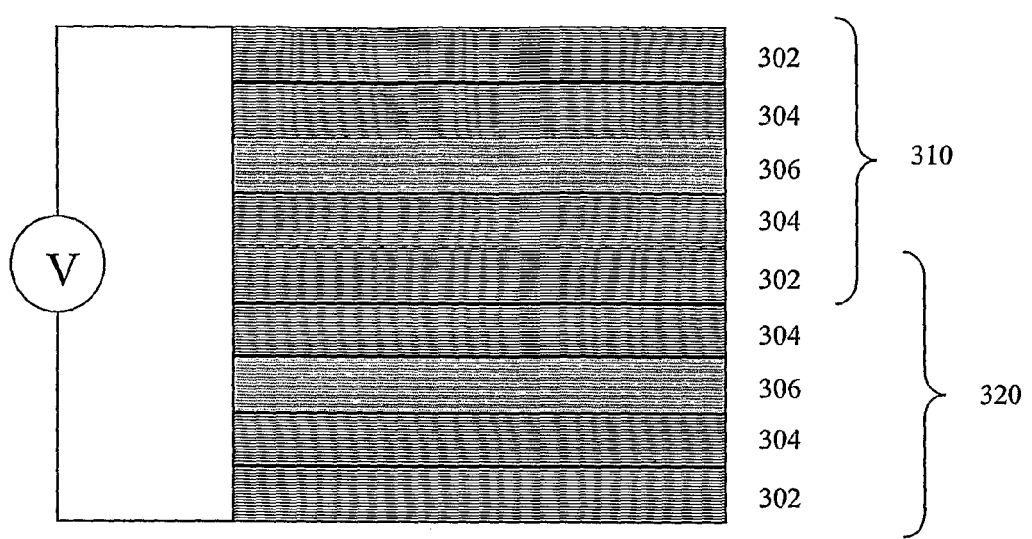
Figure 4:
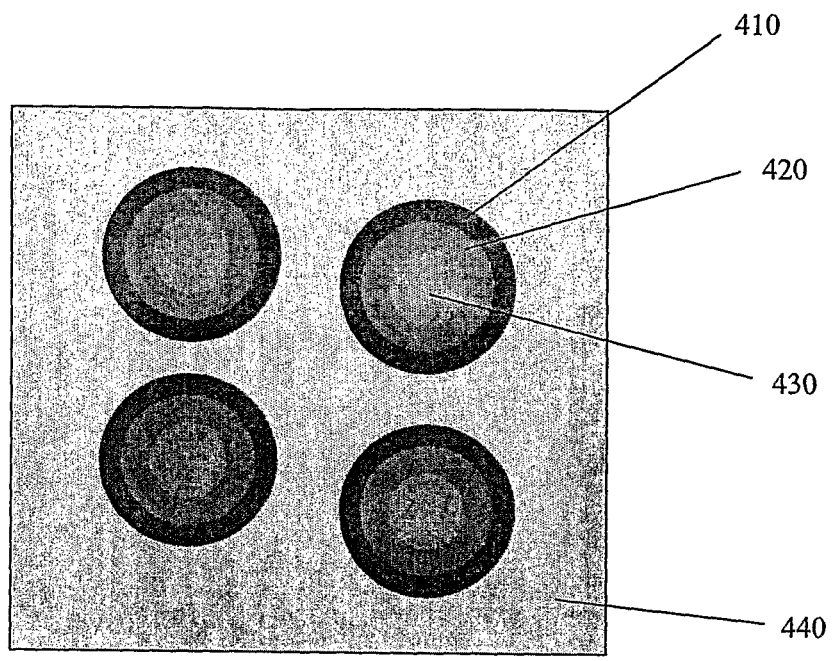

Embodiments of the invention will now be described by way of example with reference to the drawings of which:

FIG. 1. is a schematic diagram of a generic supercapacitor based on the use of the electrochemical double layer;

FIG. 2. shows an interwoven structural supercapactor according to a first embodiment of the invention;

FIG. 3. is a schematic of a laminated sequence incorporating two capacitor cells; and FIG. 4. is a schematic of a fibre-sheath supercapacitor according to a second embodiment of the invention.

In overview, the present invention relates to a multifunctional power storage structural device, namely a structural supercapacitor. Mechanical strength is provided by using a composite of woven carbon fibre electrodes and a polymer electrolyte. Unlike, for example, fuel cell solutions, structural components directly provide the energy storage, rather than simply being a small component of an energy system which is mostly liquid fuel. Double-layer supercapacitors also avoid the volume changes and electrode consumption associated with batteries, and, unlike Li-ion systems in particular, have only modest packaging requirements, making them much more adaptable to a range of structural roles.

The most common known form of supercapacitor is based on the electrochemical double layer shown in FIG. 1. In double-layer capacitors, the energy is stored by the accumulation of charge 170 at the boundary between electrode 150 and electrolyte 130. The amount of stored energy is a function of the accessible electrode surface area (which is much greater than the simple geometric area), the size and concentration of the ions dissolved in the polymer electrolyte, and the level of the electrolyte decomposition voltage. Supercapacitors consist of two electrodes 150, a separator 110, and an electrolyte 130. The two electrodes 150 are made of activated carbon, a weak granulated material, providing a high surface area. The electrodes 150 are physically separated by the electrolyte 130, often with an additional separator membrane 110; the electrolyte region 130/110 must be ionically-conducting but electrically insulating. As the dissociation voltage of the organic electrolytes is generally less than 3V, the maximum voltage for a supercapacitor is lower than conventional dielectric capacitors; however, the overall energy and power density is usually higher. Stacks of supercapacitors can be connected in series or parallel. Usually, the electrodes and electrolytes in these systems have no structural performance other than to aid fabrication and provide internal integrity.

Alternative supercapacitor structures are based on the addition of pseudo-capacitive materials, which shifts the performance more towards batteries, by increasing energy density at the expense of (dis)charge rate. They are known as pseudo-capacitors because the electrodes undergo redox reactions whilst electrolyte counter ions accumulate.

Supercapacitors achieve a favourable compromise between two parameters fundamental for energy storage devices: the energy density and the power density. The first parameter defines the amount of energy that can be stored in a given volume or weight (Watt-hours/liter or Watt-hours/kg) and the power density defines the rate at which this energy can be accumulated or discharged (W/kg).

Battery technologies offer high energy density but low power density owing to their reliance on electrochemical reactions to generate charge; typically charge or discharge takes place over a period of a few hours. Capacitors, on the other hand, offer a high power density, typically discharging in a few milliseconds, but a limited energy density. Capacitors provide a rapid means of discharge because all the charge is easily accessible (stored on the surface of conducting plates) but the limited physical size of these plates restricts the maximum charge density they can hold. The total capacitance is also related to the separation of the plates and the dielectric constant of the intervening material but energy storage is still limited to well below that of a battery.

Supercapacitors offer a compromise between batteries and conventional capacitors. They provide a high energy density together with unrivalled power density (typical energy density 6 Wh/kg and power density 0.2-5.0 kW/kg).

According to the present invention, carbon fibres are activated in any appropriate manner, as will be will known to the skilled reader, to provide electrodes 150 with the dual functionality of energy storage and mechanical properties. Referring to the general geometry of FIG. 1, conventional electrodes are replaced by layers of specially activated carbon fibre electrodes 150 and the surface is activated to increase the surface area, whilst not damaging the load-bearing core. The electrodes 150 are separated by an insulating space layer (110), preferably a glass/polymer fibre layer or a porous insulating film. The mesoporosity of the electrodes gives rise to a high contact area between electrolyte and electrode and, thus, the potential for high energy storage.

The electrodes are bonded together by an electrolyte resin which provides simultaneously high ionic conductivity/mobility and good mechanical performance (particularly stiffness). In an embodiment, the electrolytic resin has significant structural capability so as to resist buckling of the fibres in the electrode and provide significant stress transfer. In another embodiment, the polymer resin comprises oxygen-containing groups that coordinate the ions required for the ionic conductivity and cross-linking groups that generate a stiff network. Hence, both structural stiffness and ion mobility are provided.

The embodiment can be further understood with reference to FIG. 2 in which electrode mats 210 encased in a resin which is an ion conductor (not shown) are separated by a glass or polymer fibre mat 230. The electrodes preferably consist of activated structural conducting fibres to form the electrode in a woven 210 or non-woven form (see FIG. 2); the electrodes are preferably based on continuous fibres. Similarly, the glass or polymer fibre mat insulator 230 is woven and sandwiched between the electrode mats 210.

The electrodes may also be based on conductive nanofibres, especially carbon nanotubes or nanofibres. In an embodiment, the conducting fibre is a nanotube or nanofibre mat. In another embodiment, these nano-tubes or -fibres may be combined with conventional conducting fibres; most preferable they are attached to the conventional fibre surface in an approximately radial arrangement.

The electrodes 210 can be formed of unidirectional, woven or NCF continuous fibres, and can be fabricated using standard composite laminate technology known to the skilled reader; for example, liquid resin (such as Vacuum Assisted Resin Transfer Molding, Resin Film Infusion, Rein Transfer Moulding and Resin Infusion Under Flexible Tooling) or pre-preg technologies, as will be familiar to the skilled reader.

According to one embodiment the electrolyte 130 matrix is fabricated as follows: 4 g polyethylene diglycidylether (PEGDGE) mixed with 0.8 g tetrabutyl ammonium hexafluorophosphate ($TBAPF_6$) and stirred, at room temperature, until the salt is completely dissolved. A stoichiometric amount (1 g) of the amine hardener triethyltetraamine (Ciba Gigy) is added and the mixture stirred ready for use.

To fabricate the supercapacitor two layers of woven carbon fibre mats (200 $g/m^2$) are separated by a woven glass fibre mat, in particular samples of carbon fibre mat 10×10 cm are cut sandwiching the glass fibre mat which is cut slightly larger. Prior to impregnation, the mats are rinsed with acetone to remove the epoxy sizing and then undergo atmospheric air plasma treatment. The plasma treatment is conducted at an excitation power of 2 kW at a nozzle to sample distance of 1.5 cm. Both sides of the fibre mat are treated and the mat repeatedly passed under the plasma jet. Each side of the samples is treated for about 5 minutes.

Following plasma treatment the fibre mats are impregnated with the polymer electrolyte 130 from both sides using a small brush and the composite assembled. The samples are cured at room temperature under a small applied pressure (0.5 kg).

It will be seen that the lamination process can be repeated to increase the number of capacitors in series (raising the voltage) as shown in FIG. 3. For example, two laminate supercapacitors 310 and 320 are stacked; each layer containing a conventional carbon matrix 302, a carbon fibre electrolyte matrix 304, a glass mat electrolyte matrix 306, a second carbon fibre electrolyte matrix 304 and a final conventional carbon matrix 302. The outer layers of the composite laminate sequence, the conventional carbon-fibre 302 resin, act as a sealant and contact. Equally they can be constructed of conventional glass/polymer fibre to act, as the seal, with contacts made to the adjacent carbon layers. Ionically-insulating layers may be introduced between each capacitor; for example comprising a layer of conventional carbon-fibre resin composite. The conventional layers 302 additionally improve bending stiffness, and damage tolerance. The fibre orientation in these plies may be of any appropriate lay-up dependent on the structural design considerations.

As a result of the arrangements described above, the provision of mats or woven electrodes 210 and polymer electrolyte 230 provide structural functionality, such that the electrical and mechanical performances of the system approaches those of materials or systems designed solely for either purpose.

In a further embodiment, conducting polymer coatings or metal oxides are added to the electrodes 150 to create 'pseudocapacitors' improving the energy storage at the expense of creating a more complex system with slower response times.

In yet a further embodiment, a structural supercapitor is formed based on a radial fibre coating geometry. Such a fibre-sheath design can be applied to the case of a pseudocapacitor design. In order to address the fibres and avoid shorts, in FIG. 4 the carbon fibre electrode 430 is surrounded by a sheath of electrolyte 420 and a conducting outer sheath 410. In another embodiment, there may be additional pseudocapacitive layer between the carbon fibre electrode 430 and the electrolyte 420. In another embodiment, the conducting outer sheath 410 is a pseudocapacitor. A structural resin 440 holds the fibres in place, protects the fibres and transfers the load between them, if necessary. In a further embodiment, the structural resin 440 is electrically conductive; this may be achieved, for example, by adding conductive nanotubes. Four such fibre-sheath supercapacitors are shown in FIG. 4. In FIG. 4 the separate supercapacitors are shown to be isolated by resin; however, preferably, the outer conductive sheath may be shared between two or more fibre supercapacitors. In the limiting case, the outer conductive sheath entirely replaces the structural resin 440. With this system, a packing density greater than 60% could be achieved. The conducting fibres 430 are addressed separately to the outer sheath 410, in particular at the fibre ends.

Supercapacitors can be used directly as a power source but are particularly useful for loading levelling, supplying peak power to complement rechargeable battery system; the combination provides a better lifetime than either component individually.

The laminates can readily be formed into components of almost any shape, using a range of conventional composite processing techniques. The insulating spacer material may exist in particulate, perforated sheet, or fibre form. It is apparent, of course, this stacking approach could be repeated any required number of times.

The potential applications for structural supercapacitors are wide-ranging and numerous; essentially any load-bearing component in a system which requires electrical energy. It would provide considerable weight savings for applications ranging from laptop computers and mobile phones, specialised applications such as down-hole energy supplies for the petrochemical industry, power supplies for emergency equipment and propulsion systems, through to space and military applications. A potentially large market is load levelling in hybrid electric vehicles.

The invention claimed is:

1. A supercapacitor for load-bearing, the supercapacitor comprising a composite comprising:
   at least one electrode comprising a plurality of continuous fibers respectively-arranged for load-bearing, wherein the continuous fibers are activated;
   a porous insulating spacer; and
   an electrolytic resin, wherein the electrolytic resin impregnates the at least one electrode and spacer, and binds the composite.

2. A supercapacitor as claimed in claim 1 in which the electrolytic resin has structural capability so as to resist buckling of said fibers and provide stress transfer.

3. A supercapacitor as claimed in claim 1 in which the supercapacitor comprises a capacitor based on double-layer effects or pseudocapacitance.

4. A supercapacitor as claimed in claim 1 in which the porous insulating spacer is a glass fiber mat.

5. A supercapacitor as claimed in claim 1 in which the electrolytic resin comprises a polymer electrolyte.

6. A supercapacitor as claimed in claim 1 in which the continuous fibers have been activated by treatment to increase the surface area.

7. A supercapacitor as claimed in claim 1 further comprising nano-tubes or nano-fibers combined with the continuous conducting fibers.

8. A supercapacitor as claimed in claim 7 wherein the nano-tubes or nano-fibers are attached to the conducting fiber in an approximately radial direction.

9. A supercapacitor as claimed in claim 1 in which the conducting fibers are carbon fibers.

10. A supercapacitor as claimed in claim 1 comprising a plurality of electrode pairs.

11. A supercapacitor as claimed in claim 1 in which the at least one electrode is a pseudo capacitive electrode.

12. An electrical device including a supercapacitor as claimed in claim 1.

13. A device as claimed in claim 12 in which the electrical device comprises one of a laptop computer, a mobile phone, a hybrid electrical vehicle battery, an emergency equipment device, a propulsion system device or a downhole energy supply.

14. A supercapacitor as claimed in claim 1 in which the arrangement of continuous fibers comprises at least one of a unidirectional, woven or non-crimp fabric.

15. A method of fabricating an a supercapacitor for load-bearing, the method comprising:
   activating a plurality of continuous fibers respectively-arranged for load-bearing, to form an electrode of the energy storage device;
   arranging the at least one electrode in cooperation with a porous insulating spacer; and
   impregnating and binding the at least one electrode and spacer with an electrolytic resin.

16. A method as claimed in claim 15 in which the plurality of continuous fibers are respectively arranged by at least one of weaving or fiber placement.

17. A method as claimed in claim 15 in which the electrolytic resin is applied using either liquid resin methods or preimpregnated laminates.

18. A pseudocapacitor for load-bearing, the pseudocapacitor comprising a composite comprising:
   at least one electrode comprising a plurality of continuous fibers respectively-arranged for load-bearing, wherein the continuous fibers are activated;
   a porous insulating spacer; and
   an electrolytic resin, wherein the electrolytic resin impregnates the at least one electrode and spacer, and binds the composite.

* * * * *

UNITED STATES PATENT AND TRADEMARK OFFICE
CERTIFICATE OF CORRECTION

PATENT NO.        : 8,659,874 B2                                                Page 1 of 1
APPLICATION NO.   : 12/297811
DATED             : February 25, 2014
INVENTOR(S)       : Shaffer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1188 days.

Signed and Sealed this
Twenty-ninth Day of September, 2015

Michelle K. Lee
*Director of the United States Patent and Trademark Office*